(12) United States Patent
Brendle

(10) Patent No.: US 7,187,376 B2
(45) Date of Patent: Mar. 6, 2007

(54) DISPLAYING VIEWS ON COMPUTER SCREENS

(75) Inventor: Rainer Brendle, Neckargemund (DE)

(73) Assignee: SAP Aktiengesellschaft, Walldorf (DE)

( * ) Notice: Subject to any disclaimer, the term of this patent is extended or adjusted under 35 U.S.C. 154(b) by 397 days.

(21) Appl. No.: 10/232,948

(22) Filed: Aug. 30, 2002

(65) Prior Publication Data

US 2003/0222919 A1 Dec. 4, 2003

Related U.S. Application Data

(60) Provisional application No. 60/386,039, filed on Jun. 4, 2002.

(51) Int. Cl.
*G06T 1/00* (2006.01)

(52) U.S. Cl. ...................... 345/418; 715/700

(58) Field of Classification Search ................. 345/420
See application file for complete search history.

(56) References Cited

U.S. PATENT DOCUMENTS

| | | | |
|---|---|---|---|
| 5,715,415 A | 2/1998 | Dazey et al. | |
| 5,933,140 A | 8/1999 | Strahorn et al. | |
| 6,098,081 A | 8/2000 | Heidorn et al. | |
| 6,134,552 A | 10/2000 | Fritz et al. | |
| 6,314,422 B1 | 11/2001 | Barker et al. | |
| 7,137,072 B2 * | 11/2006 | Bauer et al. ................. | 715/809 |
| 2002/0054123 A1 | 5/2002 | Walden et al. | |
| 2003/0222919 A1* | 12/2003 | Brendle ....................... | 345/781 |
| 2006/0248442 A1* | 11/2006 | Rosenstein et al. ...... | 715/501.1 |

FOREIGN PATENT DOCUMENTS

| | | |
|---|---|---|
| EP | 0889418 | 1/1999 |
| EP | 0961202 | 12/1999 |
| EP | 1221661 | 7/2002 |
| WO | 00/55711 | 9/2000 |
| WO | 01/09714 | 2/2001 |
| WO | 01/57718 | 8/2001 |

OTHER PUBLICATIONS

Microsoft Word 2000. Copyright 1983-1999. Figures 1-3.*
Microsoft Internet Explorer. Version 6. Copyright 1995-2001. Figures 4-5.*
Mastering Microsoft Office 2000 Professional Edition. Courter et al. p. 30. Sybex. 1999.*
Microsoft Internet Explorer. Version 6. 1995-2001. Figs. 1-6.*

(Continued)

*Primary Examiner*—Ulka Chauhan
*Assistant Examiner*—Peter-Anthony Pappas
(74) *Attorney, Agent, or Firm*—Fish & Richardson P.C.

(57) ABSTRACT

Methods and apparatus for displaying views in computer windows. If a user links to a new view while there are unsaved changes in the current view, the system may offer the user to display the new view in a separate window. In other aspects, the system displays the new view in a separate window if there are unsaved changes in the present view. The user may link to the new view for example by clicking on a hyperlink, using a navigation button in a portal, clicking the back button in a browser, or by typing an address into an address field.

29 Claims, 6 Drawing Sheets

OTHER PUBLICATIONS

Gralla, "How Hypertext Works," *How the Internet Works*, Sixth Edition, Copyright 2002 by Que, Chapter 24, pp. 148-151.

"How to Force a New Window In Mosaic 2.4"[online],Google Groups Nov. 12, 1994, [Retrieved on Apr. 7, 2006]. Retrieved from the Internet: URL:http://groups.google.com/groups/comp.infosystems.www.providers/browse_thread/thread/4cce598a9499030e/3b0c60f69f4ac4ed.

http://forums.devshed.com/t13437/s.html—"Discussion Forums" Apr. 12-15, 2001, retreived from Internet on Sep. 17, 2003.

Smith et al. "Guidelines for Designing User Interface Software" *the MITRE Corporation*, obtained from the Internet on Nov. 25, 2004 at http://www.dfki.de/{jameson/hcida/papers/smith-mosier.pdf>, document dated Aug. 1986.

* cited by examiner

DISPLAYING VIEWS ON COMPUTER SCREENS

CROSS-REFERENCE TO RELATED APPLICATIONS

This application claims benefit from U.S. Provisional Application No. 60/386,039, filed Jun. 4, 2002 and entitled "Intelligent Navigation," which is incorporated by reference in its entirety.

TECHNICAL FIELD

The invention relates to user interfaces that display views in windows on computer screens or other display terminals.

BACKGROUND

Many computer software applications operate through a visual interface. Such applications produce one or more views that can be displayed in windows on a computer screen. During operation, a user sometimes wishes to have a new view displayed. Some new views can be displayed in the active application, while some require that a different application be launched. Moreover, the act of causing a new view to be displayed occurs in many different contexts, such as in the use of hyperlinks, clicking on a navigation button in a portal, typing a page address into an address field, and in clicking on the "back" button of a browser.

The linking from a present view to a new view currently has some shortcomings. For example, some computer applications require the user to close a transaction that the user has started in a view before beginning a new transaction. As a result, the user cannot navigate to a new view without closing the current transaction, and must decide whether to save modified data before doing so. This is disadvantageous in some cases, for example where the user needs additional data while filling out information in one application. Sometimes, in these cases, the user must close or leave the first application, obtain the necessary data from a second application, and then restart or return to the first application.

Also, many current online computer applications have stateless user interfaces that recreate the same view whenever they are activated. One example is form-based ordering or reservation services offered on the World Wide Web ("the web"). Typically, the user is asked to enter information in the form as part of an application process, and the information is transmitted to the server when the user clicks a "submit" button after filling out the form.

In some cases, the stateless application loses the information entered by the user if the user navigates to a different web page. This may happen when the user clicks on a hyperlink to navigate to a different web page, or when the user activates the "back" button on the web browser after making changes in the form. If the user wishes to resume filling out the form, it becomes necessary to re-enter the information that was lost during the navigation. This delays completion of the form and increases the risk for user mistakes.

The difficulties associated with exiting, and then returning to, a modified page have limited the efficiency and flexibility of computer networks. For example, users often need additional information when filling out an online form. In many cases, such information is available over the computer (through an internal network or the internet), but linking to such a view in the same window typically leads to loss of entered or changed data in the present view.

Attempts have been made to overcome this problem by having the application store information on the user's computer, typically the "client" in a client-server network. The state of the displayed form has been stored as a "cookie" (a resident file on the client computer). If the user navigates to a different view after filling out data in the form and later returns to the form view, the application may be able to use the cookie for restoring at least some of the lost information.

However, using cookies has several disadvantages. The solution is application specific and can require unique programming for each application to work. Even with custom programming, the cookie only holds a limited amount of information. Accordingly, the method is difficult to make generally applicable, and is unsuitable for applications that use large amounts of data.

On the other hand, it is impractical for a browser to always open a separate window when navigating to a new view. After navigating through a number of links, the windows on the screen may become so many that it is difficult to distinguish them, and having a great number of open windows may also unnecessarily burden the system.

SUMMARY

The invention relates to displaying views on computer screens or other displays. In one general aspect, the invention relates to a method by which a computer allows a user to link from a first view to a second view. A first view is displayed in a first window, and the computer receives a command to display a second view. If the first view comprises modified data that has not been saved, the computer provides that the user can choose to have the second view displayed in a second window. The user may command the display of the second view by clicking on a hyperlink, clicking the "back" button of a browser, or by typing a URL address into an address field. The command may also be provided through a portal. The user may be prompted on whether to display a second view in a second window, or the computer may display the second view in a second window without further input from the user.

Some embodiments of the present invention have the advantage of improving efficiency and flexibility in a computer network. Users that need additional information while filling out online forms can do so by linking to a new view in a separate window, if necessary. Such embodiments may increase efficiency because they allow users to fill out forms more accurately and there is less need to close and reopen computer applications. Also, there is no need to re-enter data upon returning to an online form.

The details of embodiments of the invention are set forth in the accompanying drawings and the description below. Other features, objects, and advantages of the invention will be apparent from the description and drawings, and from the claims.

DETAILED DESCRIPTION

Figure 1:
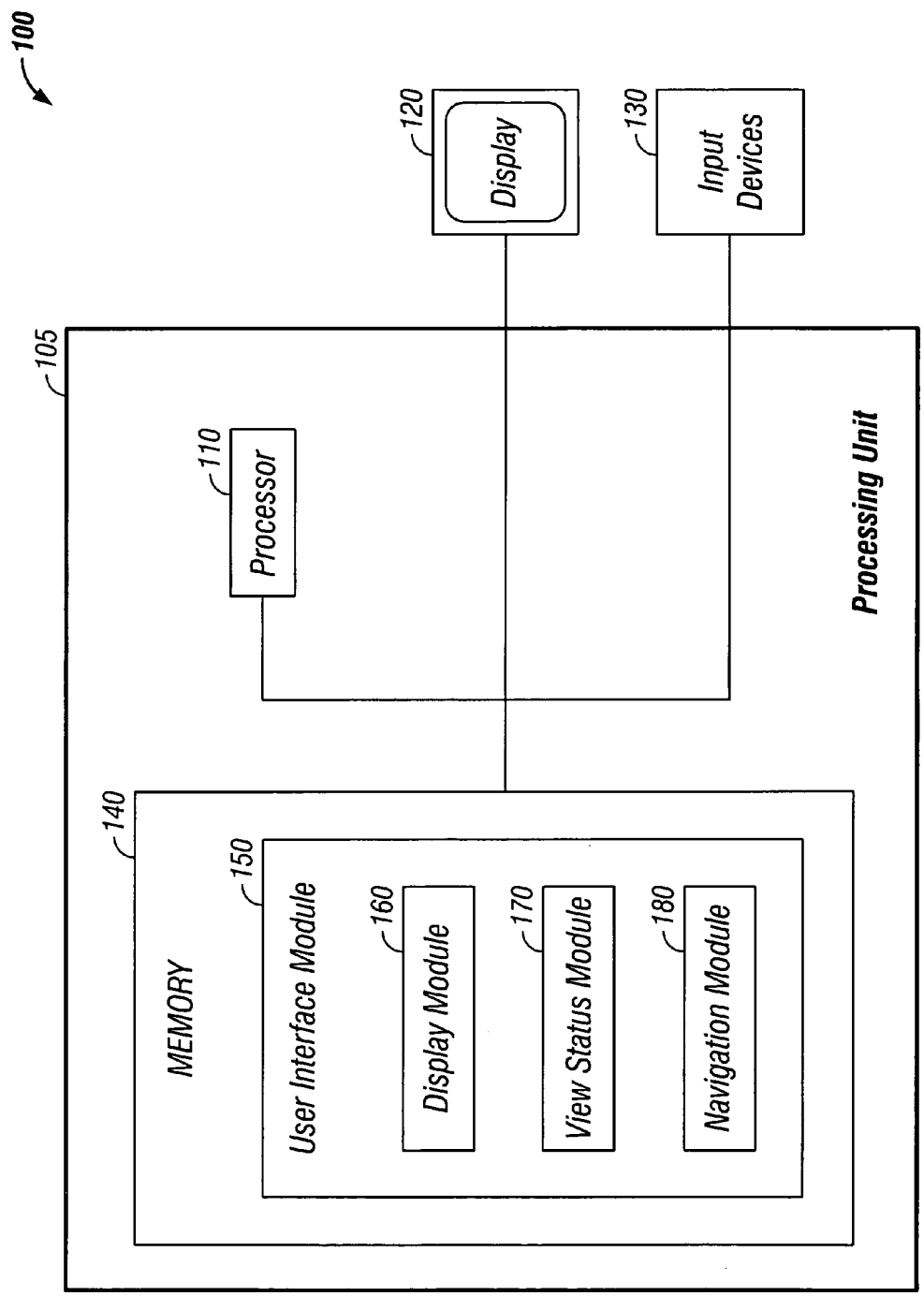
FIG. 1 is a block diagram of a computer system containing a user interface.

FIG. 1 shows a computer system 100 including a processing unit 105, a display 120 for displaying views in accordance with the invention, and one or more input devices 130. The processing unit 105 includes a processor 110 connected to memory 140, to the display 120, and to the input devices 130. Memory 140 may include one or more categories of memory such as random access memory and read-only memory.

Memory 140 stores a user interface module 150 that may cause information to be displayed on display 120, and receive commands and instructions through input devices 130, as will be described below. In the implementation shown in FIG. 1, the user interface module 150 includes a display module 160, a view status module 170 and a navigation module 180. The display module 160 is designed to display views in one or more windows on the display 120. The view status module 170 monitors the status of data displayed by the display module 160. The navigation module 180 is designed to receive commands through input devices 130 and access the view status module 170 for controlling the display module 160, as will be described below with reference to FIGS. 2A–2D.

The system 100 is illustrated in simplified schematic form, and may include additional structures that are not shown, such as a video display adapter. The memory 140 may also, as is conventional, contain other components that are well-known in the art, such as instructions for the operation of display 120 and input devices 130. In addition, memory 140 could be located elsewhere, such as on processor 110, and the modules 150–180 could be broken up and scattered about the memory 140, or combined with each other, or held in memory at different times.

Figure 2A:
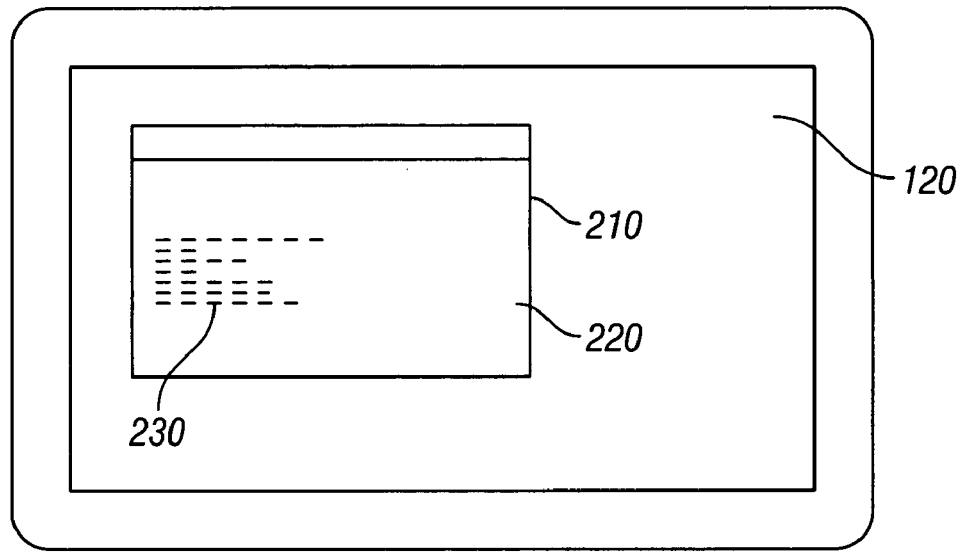
FIGS. 2A–2D are exemplary screens that may be displayed by the computer system in FIG. 1.

FIG. 2A schematically shows the display 120 displaying a window 210. This may occur by operation of a display module 160 as shown in FIG. 1. The shown size, shape, and appearance of window 210 are exemplary.

The window 210 contains a view 220 which may be a web page displayed in a browser window. The view 220 contains exemplary contents 230, which may be an electronic object that the system 100 can store, display, and modify. For example, the contents 230 may contain data such as text.

Figure 2B:
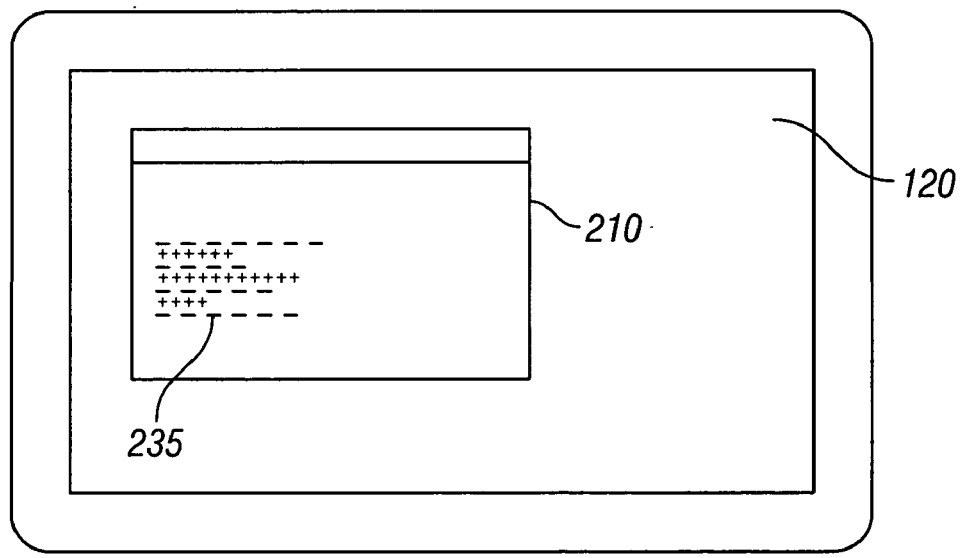

The user typically is able to make changes in the contents 230. FIG. 2B shows window 210 with contents 235 different from contents 230 in FIG. 2A. The changes may comprise adding, removing, modifying, or otherwise manipulating data in any way.

The view status module 170 may monitor the status of the view 220 to determine whether any changes have been made in its contents. For example, when the system 100 first displays the view 220, the view status module 170 may set the status of the view 220 to "no unsaved changes." If the user makes changes in the view 220, the view status module 170 may set the view status to "unsaved changes exist" to reflect this change in status. If the changes in view 220 are saved, meaning that they are made persistent to the system 100, the view status module 170 may again set the status of the view 220 as "no unsaved changes" to reflect that the user has not made any changes in the view as it is currently displayed. The above status values are exemplary.

One example of how the status of a view can be controlled is by a status value stored in association with the view. For example, if the view is a page of hypertext markup language (HTML) text, the status of the page (i.e., whether it contains any unsaved changes), can be stored as a value in a field of the page. The initial value may be changed if the user later makes changes in the view without saving them. The view status can be determined by reading the stored status value.

While a view is being displayed, the user can prompt the system 100 to display a new view. The user may make this command by clicking on a hyperlink to navigate between HTML pages, or by any other input through the input devices 130. For example, the view 220 may contain a portal through which the user may command the system 100 to display the new view. As another example, when the view 220 is a page displayed in a browser, the user may type the address of the new view into an address field of the window 210 to instruct the system 100 to display the new view. As another example, the new view may be a view that the system 100 displayed before displaying the present view. The user may then use a "back" button on the browser. As another example, the user may command the system to display a new view by clicking on an item in a list of links, such as in a "favorites" menu of a browser.

When the user commands the system 100 to display a new view, the navigation module 180 uses the view status module 170 to determine if there are any unsaved changes in the present view 220. Using the status values from above as an example, the view status module 170 reports whether any unsaved changes exist.

Figure 2C:
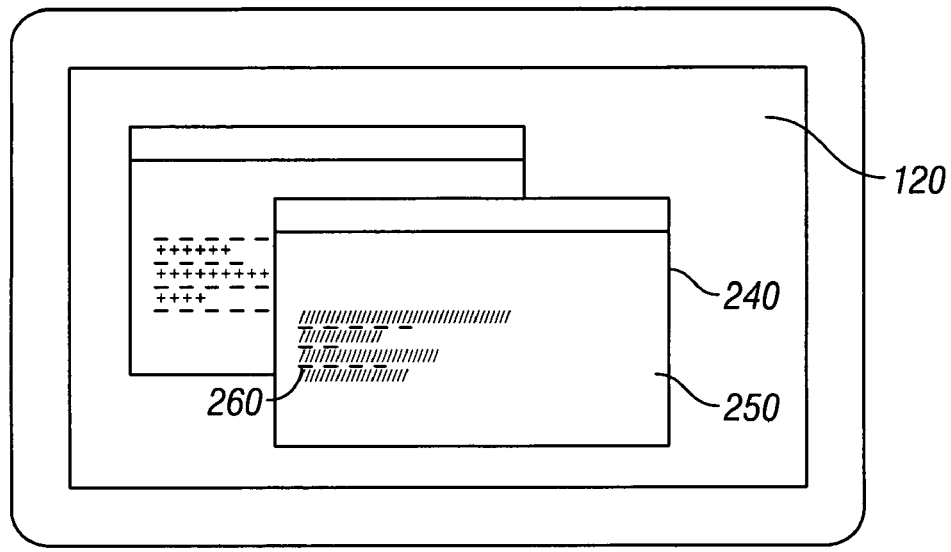

The navigation module 180 will not immediately display the new view in the window 210 if there are unsaved changes in the view 220. Rather, the navigation module 180 will provide that the new view can be displayed in a separate window so that the unsaved data in view 220 is not compromised. FIG. 2C shows the display 120 with a separate window 240 containing the new view 250.

In some embodiments, the navigation module 180 always displays the new view 250 in the separate window 240 when there are unsaved changes in the present view 220. As a result, the user does not risk losing unsaved data while attempting to navigate to a new page.

In other embodiments, the navigation module 180 offers the user to have the new view displayed in a separate window. This may take place by the display module 160 displaying a message to the user on the display 120. For example, the display module 160 may offer the user the option to select between having the new view displayed in the same window or in a separate window. As another example, the user may select between saving the modified data and displaying the new view in the current window; not saving the modified data and displaying the new view in the current window; and displaying the new view in a separate window. The user may use the input devices 130 to select one of the offered alternatives.

Figure 2D:
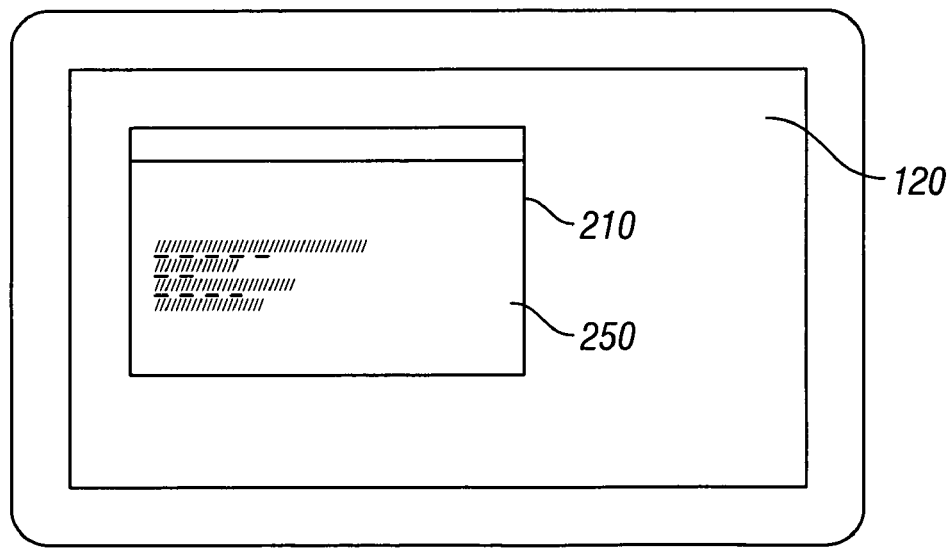

If there are no unsaved changes in the view 220 when the user commands a new view to be displayed, the navigation module may display the new view 250 in the present window 210 as shown in FIG. 2D. In embodiments where the views 250 and 220 are pages viewable in a browser, the user can thereafter return to view 220 by activating a "back" button or similar function.

In some embodiments, the view is a page of a computer application displayed within a portal in window 210. In such embodiments, the portal may contain links, buttons, etc. for navigating between views and between different applications. The application or applications may be configured to share the page status with the portal. One example of such status sharing is by using a framework between the portal and the application, by which the portal is made aware of any unsaved changes. In other embodiments, the portal may query the application for the status of the page view when the user activates one of the portal's navigation functions.

Figure 3:
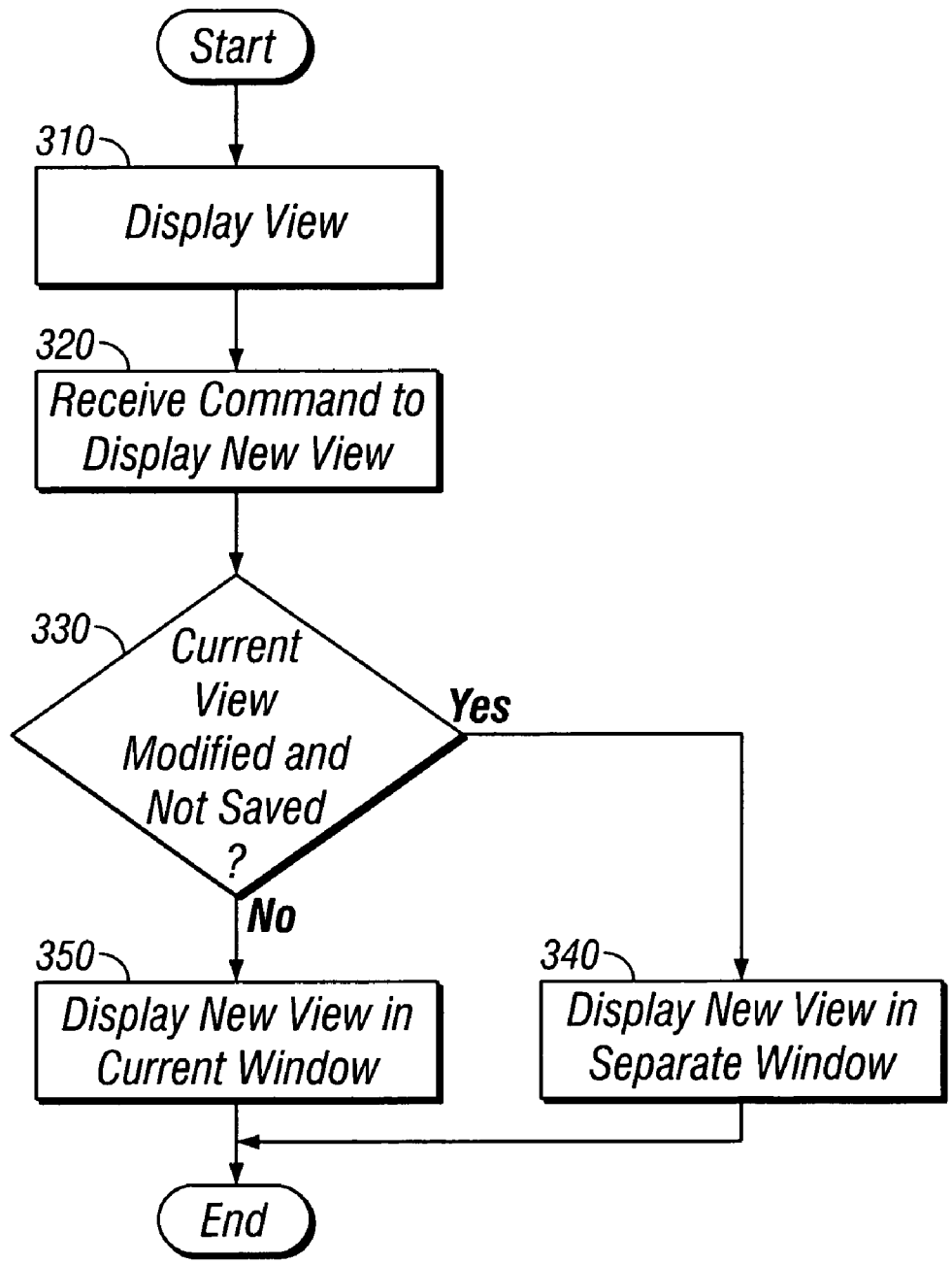
FIG. 3 is a flow chart of steps that may be performed by the system in FIG. 1.

FIG. 3 is a flow chart of steps that are carried out in some embodiments. Referring to FIGS. 1–3, step 310 involves the display module 160 displaying the view 220 in the display 120. In step 320, the navigation module 180 receives a command to display a new view, which command may have been input by the user through the input devices 130. The command may be received in various ways, such as by the activation of a hyperlink, by control functions of a portal, by typing a page address into an address field, and by activating the "back" button of a browser window. The navigation module 180 determines in step 330 whether there are unsaved changes in the view 220. This may involve using a view status module 170 that registers the view status. As another example, step 330 may involve detecting whether there are any unsaved changes. When the view is a page containing HTML text, the view status may be stored in a field of the page code as has been described above. If there are unsaved changes, the navigation module in this example displays the new view 250 in a separate window 240 in step 340. If there are no unsaved changes in the view 220, the navigation module causes the new view 250 to be displayed in window 210.

Figure 4:
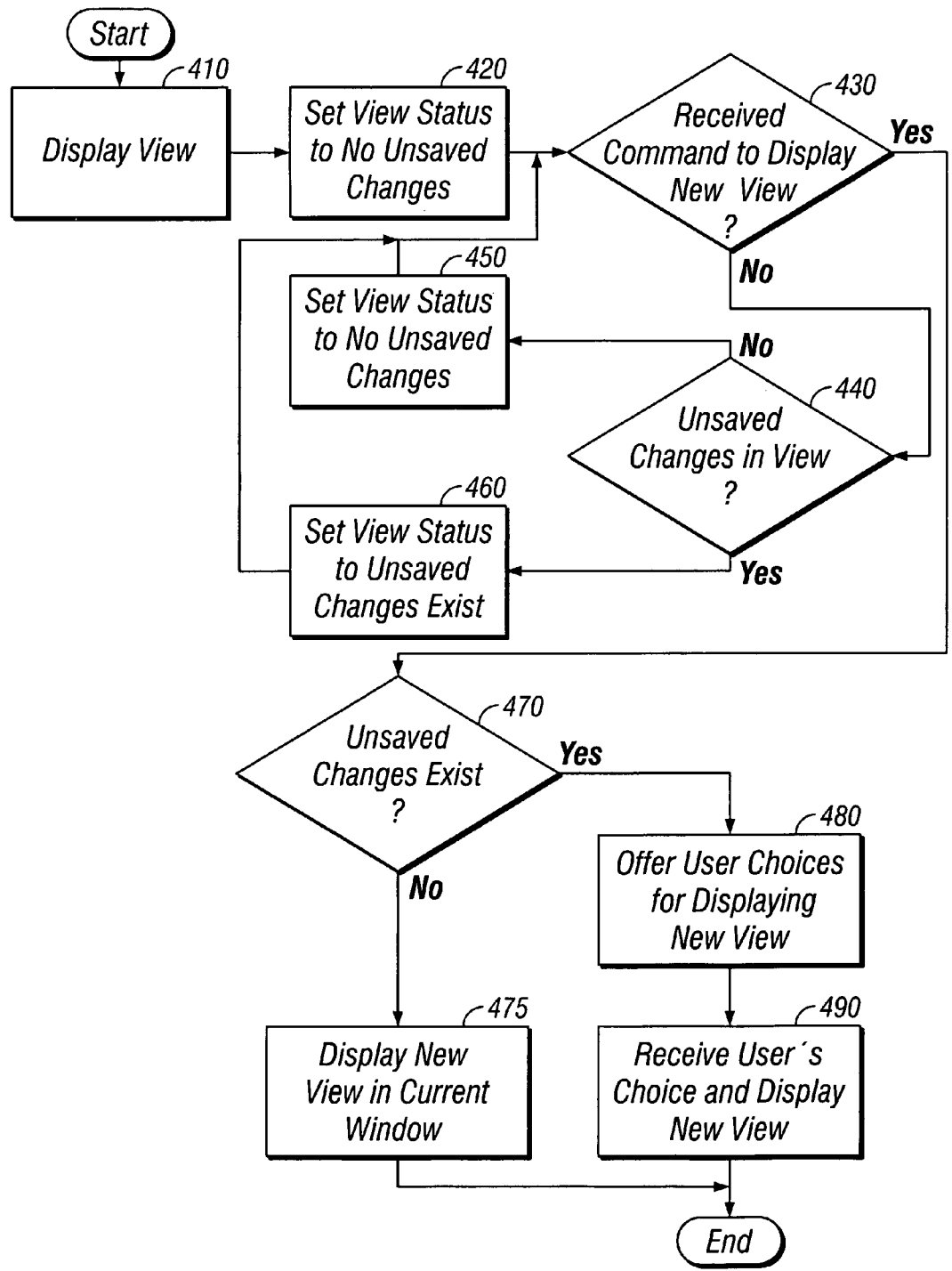
FIGS. 4A–4B is another flow chart of steps that may be performed by the system in FIG. 1.

FIGS. 4A–4B is a flow chart of steps that may be performed by one or more embodiments. Referring to FIGS. 1, 2A–2D, and 4A, step 410 involves the display module 160 displaying a view on the display 120. In step 420, the view status module 170 sets the view status to "no unsaved changes." In certain embodiments, step 420 may be carried out at the same time as, or before, step 410. In step 430, the navigation module determines whether the user has entered a command to display a new view. This command may be made and received in different ways, such as those described above with regard to FIG. 3. If such a command has not been received, the view status module 170 monitors the status of the view in step 440. If there are no unsaved changes—for example because the user has made no changes or because the made changes have been saved—the view status module 170 sets the view status to "no unsaved changes" in step 450. If the view status module 170 detects unsaved changes in step 440, it proceeds to set the view status value to "unsaved changes exist" in step 460. After either of the steps 450 and 460, the navigation module probes for a command from the user in step 430.

If a command has been received in step 430, the navigation module uses the view status module 170 in step 470 to determine the view status. If there are unsaved changes in the present view, the display module 160 in step 480 may display a message offering the user choices for how to display the new view. Several different choices may be made, for example those described above (saving the modified data and displaying the new view in the current window; not saving the modified data and displaying the new view in the current window; and displaying the new view in a separate window). The navigation module 180 receives the user's choice in step 490 and displays the new view accordingly. For example, the navigation module displays the new view in a separate window if that is what the user chooses. In contrast, if there are no unsaved changes in step 470, the navigation module in step 475 causes the new view to be displayed in the current window.

Figure 5:
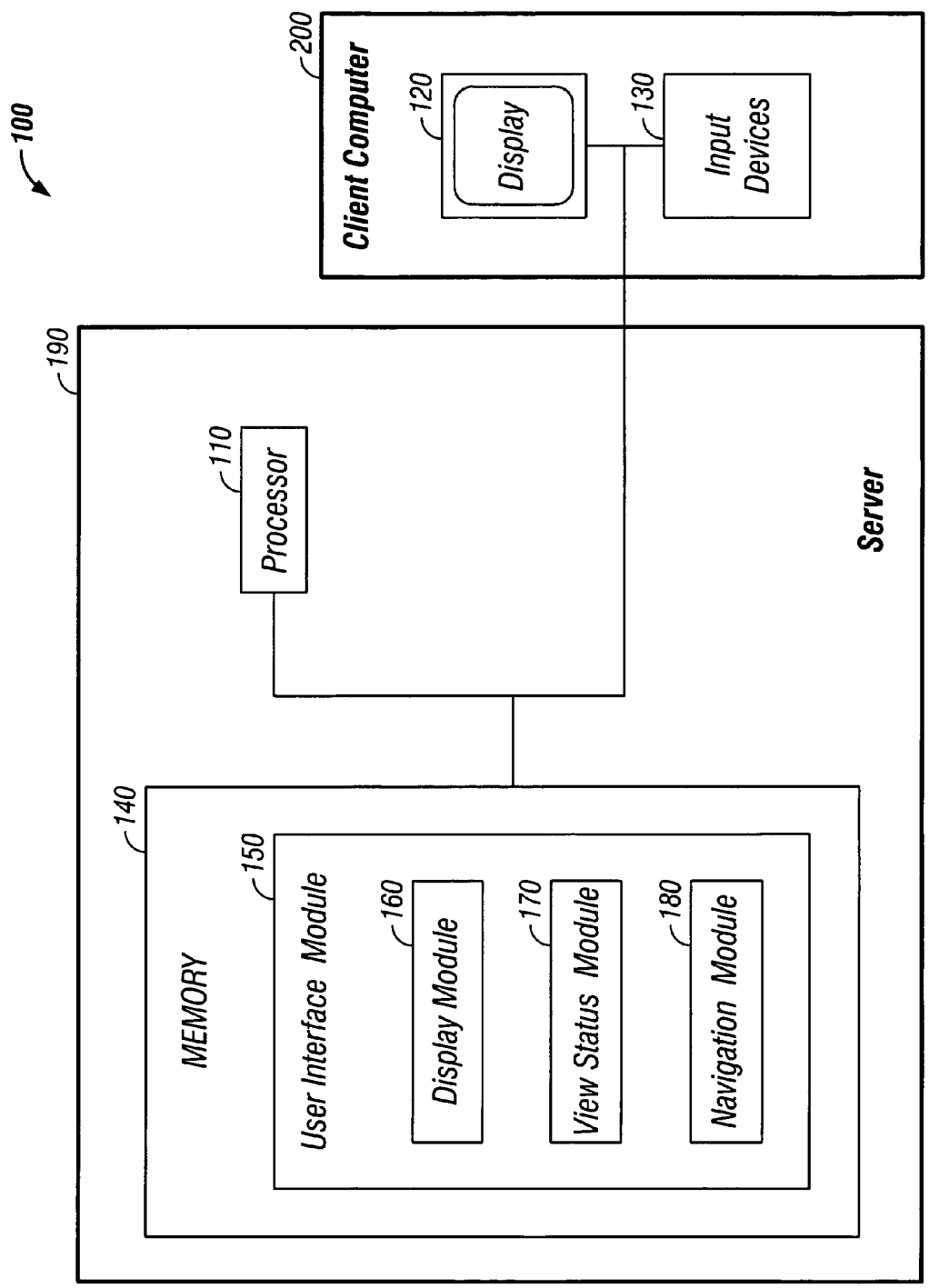
FIG. 5 is another block diagram of a computer system containing a user interface in accordance with the invention.

Embodiments may also be useful in remote display of views, such as in a client-server network. FIG. 5 schematically shows a system including components of the system shown in FIG. 1. The user interface module 150 including navigation module 180 resides on a server 190. The display 120 and input devices 130 are part of a client computer 200 connected to the server 190. The client computer 200 also includes other conventional components that are not shown in FIG. 5, such as a processor and a memory. Systems according to FIG. 5 may be used for displaying views when a user accesses pages over the internet. When the user links from a view with unsaved changes, the server 190 provides that the new view may be displayed in a separate window.

The following is an example of using the system of FIG. 5 to display views. A user operating the client computer 200 works with an application launched by server 190. The display module 160 displays a view on display 120. The user makes changes in the view. The client computer 200 transmits the changes (in form of an addition, deletion, modification, etc.) to the server 190. At this time in the example, the user has not commanded the system to save the changes. The view status module 170 sets the view status value to "unsaved changes exist". The server 190 stores the changes in memory 140, but does not commit the changes to the application. If the user links to a second view, the view status value will indicate that unsaved changes exist, and the user will be offered to have the second view displayed in a separate window.

A number of embodiments of the invention have been described. Nevertheless, it will be understood that various modifications may be made without departing from the spirit and scope of the invention. For example, the modules described above may be organized or contained in various ways, and may reside on multiple computers. Also, the steps described above may be modified in various ways or performed in a different order than described above, where appropriate. Accordingly, other embodiments are within the scope of the following claims.

I claim:

1. A computer-implemented method for providing a choice between windows for displaying a view on a display device, comprising:

displaying a first view in a first window on a display device;

receiving a command from a user to display a second view on the display device;

determining, in response to receiving the command, whether the first view comprises modified data that has not been saved, and displaying, in response to determining that the first view comprises the modified data, a message prompting the user to select a window for displaying the second view, the message providing that the user can choose at least between (i) having the second view displayed in the first window, and (ii) having the second view displayed in a second window on the display device.

2. The method of claim 1, further comprising setting a view status reflecting that no data in the first view has been modified.

3. The method of claim 2, further comprising changing the view status after data in the first view has been modified.

4. The method of claim 1, wherein receiving the command comprises the user activating a hyperlink.

5. The method of claim 1, wherein receiving the command comprises receiving a command through a portal associated with the first view.

6. The method of claim 1, wherein the second view comprises a view displayed prior to the first view.

7. The method of claim 1, wherein the command comprises an address.

8. A computer-implemented method for selecting a window for displaying a view on a display device, comprising:

displaying a first view in a first window on a display device;

receiving a command from a user to display a second view on the display device;

determining, in response to receiving the command, a window for displaying the second view, the determination being based on whether the first view comprises modified data that has not been saved, and displaying the second view in accordance with the determination, wherein the second view is displayed in a second window on the display device if the determination shows that the first view comprises the modified data, and wherein the second view is displayed in the first window on the display device if the determination shows that the first view does not contain the modified data.

9. The method of claim 8, further comprising setting a view status reflecting that no data in the first view has been modified.

10. The method of claim 9, further comprising changing the view status after data in the first view has been modified.

11. The method of claim 8, wherein the second view comprises a view displayed prior to the first view.

12. Computer readable medium having stored thereon instructions for causing a digital data processing system to perform operations comprising:

display a first view in a first window on a display device;

receive a command from a user to display a second view on the display device;

determine, in response to receiving the command, whether the first view comprises modified data that has not been saved, and display, in response to determining that the first view comprises the modified data, a message prompting the user to select a window for displaying the second view, the message providing that the user can choose at least between (i) having the second view displayed in the first window, and (ii) having the second view displayed in a second window on the display device.

13. The medium of claim 12, wherein receiving the command comprises the user activating a hyperlink.

14. The medium of claim 12, wherein receiving the command comprises receiving a command through a portal associated with the first view.

15. The medium of claim 12, wherein the second view comprises a view displayed prior to the first view.

16. The medium of claim 12, wherein the command comprises an address.

17. Computer readable medium having stored thereon instructions for causing a digital data processing system to perform operations comprising:

display a first view in a first window on a display device;

receive a command from a user to display a second view on the display device;

determine, in response to receiving the command, a window for displaying the second view, the determination being based on whether the first view comprises modified data that has not been saved, and display the second view in accordance with the determination, wherein the second view is displayed in a second window on the display device if the determination shows that the first view comprises the modified data, and wherein the second view is displayed in the first window on the display device if the determination shows that the first view does not contain the modified data.

18. The medium of claim 17, wherein receiving the command comprises the user activating a hyperlink.

19. The medium of claim 17, wherein receiving the command comprises receiving a command through a portal associated with the first view.

20. The medium of claim 17, wherein the second view comprises a view displayed prior to the first view.

21. The medium of claim 17, wherein the command comprises an address.

22. A computer system for providing choice between windows for displaying a view, the computer system comprising:

a display module capable of displaying a first view in a first window on a display device;

a view status module for determining whether the first view comprises modified data that has not been saved; and a navigation module for receiving a command from a user to display a second view on the display device, the navigation module being configured to cause, in response to receiving the command and the view status module determining that the first view comprises the modified data, the display module to display a message prompting the user to select a window for displaying the second view, the message providing that the user can choose at least between (i) having the second view displayed in the first window, and (ii) having the second view displayed in a second window on the display device.

23. The system of claim 22, further comprising a hyperlink that the user can activate to display the second view.

24. The system of claim 22, further comprising a portal associated with the first view, the navigation module being capable of receiving the command through the portal.

25. The system of claim 22, wherein the second view comprises a view displayed prior to the first view.

26. The system of claim 22, wherein the command comprises an address.

27. A computer-implemented method for providing a choice between windows for displaying a view on a display device, comprising:

displaying a first page in a first window on a display device, a field of the first page having stored a status value indicating that no unsaved changes exist in the first view;

determining whether unsaved changes are made in the first page;

setting, in response to determining that the unsaved changes are made in the first page, the status value to indicate the existence of the unsaved changes;

receiving a command from a user to display a second page on the display device;

determining, in response to receiving the command, whether the status value indicates that the unsaved changes exist, and displaying, in response to determining that the status value indicates that the unsaved changes exist, a message prompting the user to select a window for displaying the second view, the message providing that the user can choose at least between (i) having the second view displayed in the first window, and (ii) having the second page displayed in a second window on the display device.

28. The method of claim 27, wherein receiving the command comprises receiving a command through a portal associated with the first view.

29. The method of claim 27, wherein the second view had been displayed on the display device before displaying the first view.

* * * * *